Figure 1:
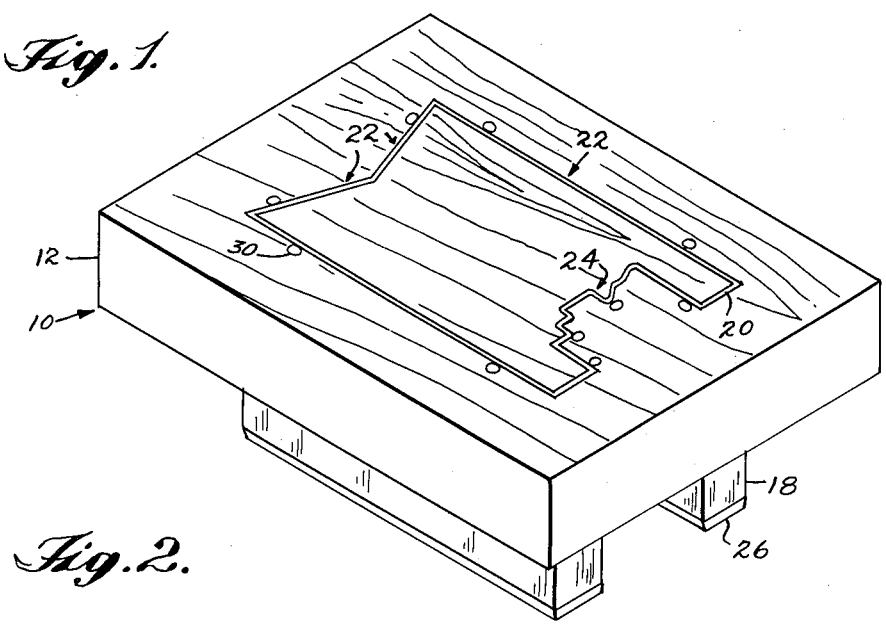

May 29, 1962 E. K. SCOTT ETAL 3,036,478
METHOD OF MAKING STEEL RULE CUTTING DIES
Filed March 30, 1961

INVENTORS
ERHARDT K. SCOTT
MAXAMILLIAN LEE SCOTT

BY Cushman, Darby & Cushman
ATTORNEYS

# United States Patent Office 3,036,478
Patented May 29, 1962

3,036,478
METHOD OF MAKING STEEL RULE CUTTING DIES
Erhardt Kenneth Scott and Maxamillian Lee Scott, New York, N.Y., assignors to Accurate Steel Rule Die Manufacturers, New York, N.Y., a partnership
Filed Mar. 30, 1961, Ser. No. 99,477
2 Claims. (Cl. 76—107)

This invention relates to steel rule cutting dies, also known as dinking dies, and particularly to an improvement in the anchoring of the cutting element to its base.

Conventionally, a steel rule cutting die includes of a flat base and a steel strip, commonly called a rule, secured along one edge to the base and having a cutting edge projecting from the base. Prior to its being fastened to the base, the rule is formed to the contour of the blank which is desired to be cut from a sheet of material. Conventionally, the shaped rule is fitted into a jig-sawed slot in a plywood base and is held in place by friction between the rule and the plywood. In use, the completed die is inserted into a stamping press which then forces the shaped cutting edge of the rule into and through the sheet of material. Cutting dies of this type are economically fabricated and are useful for cutting blanks of desired shape from materials such as paper, cardboard, plywood, rubber, plastics and asbestos. These dies, however, suffer from several disadvantages as a result of the manner in which the rule is fastened to the plywood base. For example, when thick sheets of material are die cut, the rule tends to pull out of the slot in the base. The conventional procedure for overcoming this tendency is to wedge the rule with additional slivers of rule. While this procedure tightens the rule in place, it also tends to spread the die, thus destroying the accuracy of the die.

Another disadvantage is that the replacing of a dull cutting rule with another of the same shape tends to reduce the tight fit of the later inserted rule. The present invention overcomes these disadvantages by a fast and economical method which requires little skill and no costly materials. Broadly, the method of the invention includes the forming of small holes transversely through the rule near the edge which is opposite the cutting edge, inserting the rule into the slot in the base, forming holes in the base adjacent the holes in the rule, and driving nail means at an angle to the rule through the holes in the base, through the holes in the rule and into base.

A primary object of the present invention is, therefore, to provide a method for rapidly, economically and effectively fixing a cutting rule in a base against any tendency of the rule to pull out of the base during use.

A further object of the present invention is to provide a method for rigidly fixing a cutting rule in a base which does not tend to deform the die and destroy its accuracy.

A further object of the present invention is to provide a method for rigidly fixing a cutting rule in a base which permits ready removal of the rule when desired.

Figure 2:
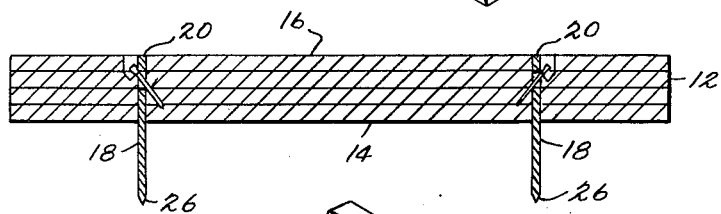
Figure 3:
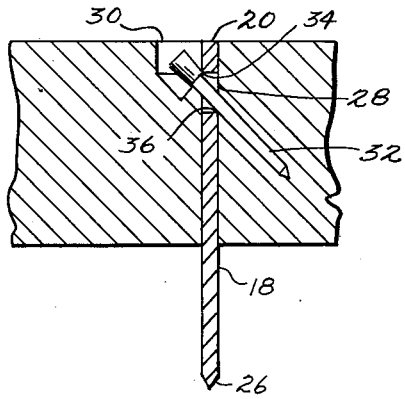
Figure 4:
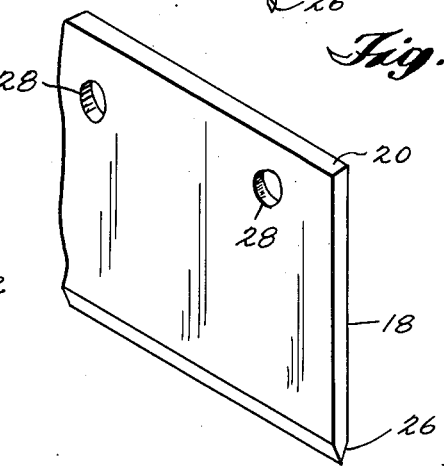

Further objects and advantages will become apparent upon reading the following description taken in conjunction with the drawings in which:

FIGURE 1 is a perspective view of a steel rule cutting die constructed by the method of the present invention, FIGURE 2 is an elevational sectional view of the die of FIGURE 1, FIGURE 3 is an enlarged fragmentary view of part of FIGURE 2, and FIGURE 4 is a side elevational view of a steel cutting rule which is ready to be fixed in a base by the method of the invention.

Referring now to the drawings, there is shown a steel rule cutting die 10 which includes a plywood base 12 having a front surface 14 and a back surface 16 and a steel cutting rule 18 having a back edge 20 which has been inserted into a jig-sawed slot in the base 12. In practice, the plywood base 12 would be about ¾ inch thick and the rule would be a hardened steel strip about 1 inch wide, up to 3/16 inch and of any suitable length. As shown in FIGURE 1, the die illustrated therein consists of several straight lengths 22 of rule and a curved length 24 fitted end to end in a slot in the base 12 with their cutting edges 26 projecting therefrom to form the contour of the desired blank.

As has been indicated, the rule 18 is conventionally held in the slot by friction between the rule and the base material. The improved construction of the present invention is best seen in FIGURES 2 and 3 which illustrate the additional features required over the conventional friction fit. FIGURE 4 shows a straight length of steel cutting rule 18 which has two spaced holes 28 punched transversely therethrough near the back edge 20. The number, spacing and precise location of the holes 28 is not critical and may be varied depending on the length, thickness and ultimate shape of the rule. However, it is preferable to locate the holes as near to the back edge 20 as practicable. After the holes 28 have been punched in the straight length of rule, the rule is shaped, if necessary, to the desired contour and is inserted into the jig-sawed slot in the plywood base 12 so that the back edge 20 is flush with the back surface 16 of the base as seen in FIGURES 1 and 3. The next step consists of drilling a plurality of holes 30 of uniform depth into the back surface 16 of the base at locations along the outside of the rule and adjacent the holes 28 in the rule. As seen in FIGURES 1 and 3 the edge of each hole 30 nearest the rule is coextensive with the slot which holds the rule, and each hole 30 has been drilled to a depth which barely exposes the adjacent hole 28 in the rule. The securing of the rule to the base is then completed by inserting a small wire nail 32, or wire brad, into each of the holes 30, through the holes 28 in the rule and driving the nail into the solid base material on the opposite side of the rule. The nails 32 should engage the upper outer edge of each hole 22 as at 34 and the lower inner edge as at 36 so that the rule is held against any movement in a direction transverse to the base. The nail 32 should be driven far enough into the base material to hold the rule rigidly and to bring the head of the nail below the outer edge of the hole 30 in the base. The latter feature restores the flat surface of the rear of the die so that it will properly fit into the stamping press. The nails 32 are smaller in diameter than the holes 30 so that they may be readily inserted. When the rule requires replacement, the nails may be simply removed with sharp nosed pliers. The preferred relationship between holes 28, holes 30 and the nails 32 as seen in FIGURE 3 permits the nails to be driven at an angle of 45 degrees with the rule.

Thus, it will be seen that the method of the invention rigidly, simply and accurately secures the rule to the base. The method is fast and economical, requiring little skill, no costly materials, and no threading and tapping of the metal. The rule is not deformed by the method and may be readily removed from the base and replaced with another.

While the preferred relationship among the size and position of the holes 28 and the holes 30 has been illustrated above, it should be understood that the method of the invention contemplates modifications in which the depth of the holes 30, the spacing of the holes 30 from the rule and the angle of the nails vary from those in the preferred embodiment.

What is claimed is:
1. The method of anchoring an elongated steel cutting rule in a base member which comprises: forming a plurality of holes transversely through the rule near the edge thereof which is opposite the cutting edge; forming a slot in the base to receive the edge of the rule which is opposite the cutting edge; inserting the rule into the slot so that the cutting edge projects from the base member, forming a plurality of spaced holes in the base member near the rule at locations adjacent the holes in the rule; and driving nail means of considerably smaller diameter than the holes in the base member at an angle to the rule through the holes in the base member to a depth such that the heads of the nail means are brought below the outer edge of the holes in the base member, through the holes in the rule and into the base means thereby holding the rule without deformation in the slot.

2. The method of mounting an elongated steel cutting rule in a base member having relatively flat, parallel front and back surfaces which comprises: forming a plurality of holes transversely through the rule near the edge thereof which is opposite the cutting edge; forming a slot in the base member to receive the edge of the rule which is opposite the cutting edge; inserting the rule into the slot so that the cutting edge thereof projects from the front surface of the base member and the opposite edge thereof is flush with the back surface of the base member and so that the surfaces of the slot cover the holes; drilling a plurality of spaced holes into the back surface of the base member adjacent and parallel to the rule at locations adjacent the holes in the rule and to a depth such that the holes in the base member barely expose one edge of the holes in the rule; inserting nail means of considerably smaller diameter than the holes in the base member at an angle to the rule through the holes in the base member and through the holes in the rule, the angle being such that the nail means engage opposite edges of the holes in the rule; and driving the nail means into the base member material to a depth such that the heads of the nail means are brought below the outer edge of the holes in the base member.

References Cited in the file of this patent

UNITED STATES PATENTS

| | | |
|---|---|---|
| 485,939 | Von Ilanor | Nov. 8, 1892 |
| 2,817,273 | Phillips et al. | Dec. 24, 1957 |
| 2,863,337 | Ackley | Dec. 9, 1958 |